United States Patent [19]

Nakamura

[11] 4,245,311
[45] Jan. 13, 1981

[54] ELECTRONIC CASH REGISTER

[75] Inventor: Goshi Nakamura, Akishima, Japan

[73] Assignee: Casio Computer Co., Ltd., Tokyo, Japan

[21] Appl. No.: 8,888

[22] Filed: Feb. 2, 1979

[30] Foreign Application Priority Data

Feb. 10, 1978 [JP] Japan .................................. 53-14346
Feb. 10, 1978 [JP] Japan .................................. 53-14347

[51] Int. Cl.³ ........................ G06F 15/21; G06F 15/02
[52] U.S. Cl. ..................................... 364/405; 364/900
[58] Field of Search ........................ 364/404, 405, 900

[56] References Cited

U.S. PATENT DOCUMENTS 4,084,238  4/1978  Masuo .................................. 364/405
4,159,533  6/1979  Sakurai ............................ 364/405 X Primary Examiner—Jerry Smith
Attorney, Agent, or Firm—Frishauf, Holtz, Goodman & Woodward

[57] ABSTRACT

An electronic cash register includes a keyboard having data input keys and a registration complete key, and a memory into which input data is stored by operating the data input keys. The input data of the memory is read out by a central processing unit and printed onto a sheet in a printing section. The cash register further includes a flag memory for storing a flag and a time keeping circuit into which present time data is set, the above-mentioned flag indicating a time period elapsing from an operation of the registration complete key to the start of a next registration operation. When the flag of the flag memory does not indicate the above-mentioned time period, i.e. a registering operation is being effected, an operation other than the registering operation, such as a present time display operation or an alarm operation, is inhibited. When the flag of the flag memory indicates the above-mentioned time period, a present time display operation or an alarm operation is permitted.

3 Claims, 10 Drawing Figures

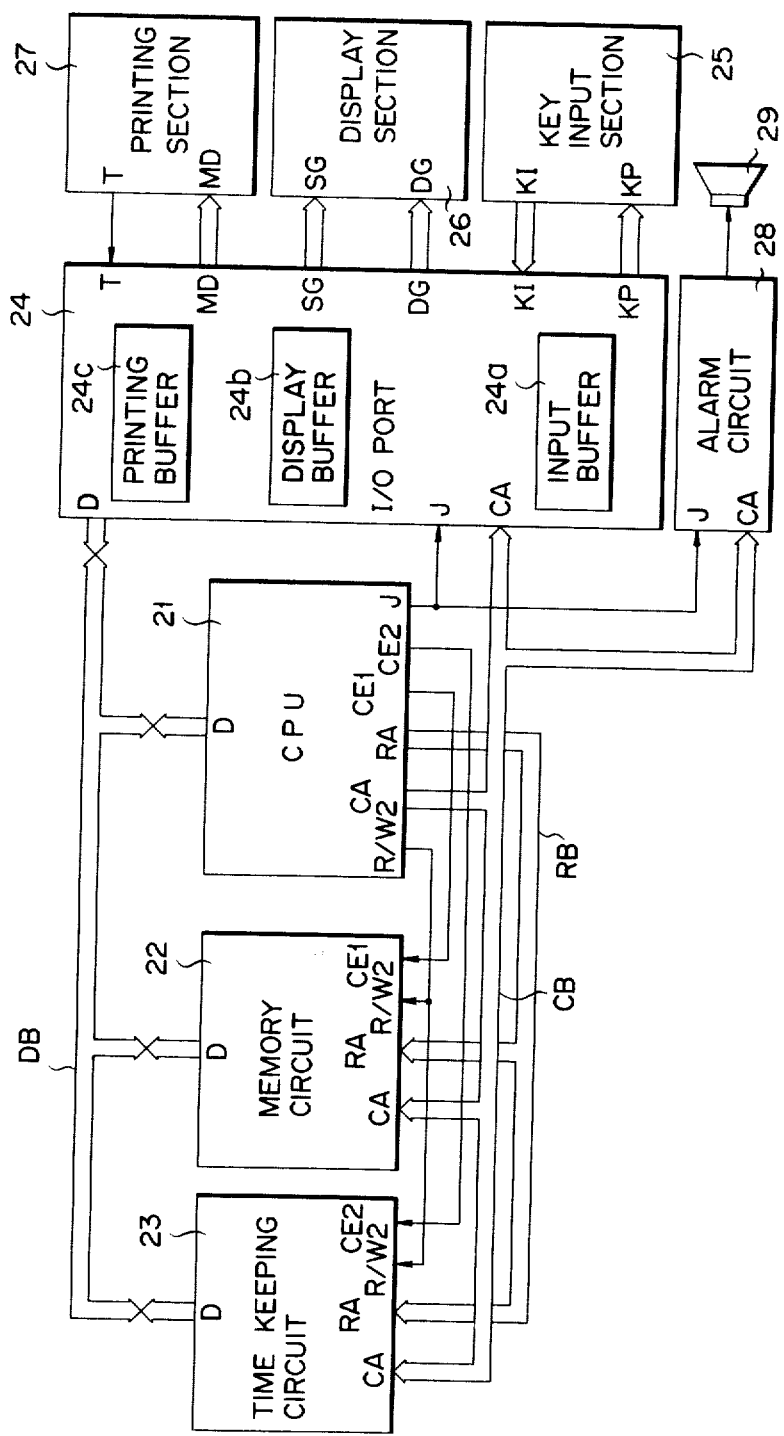
F I G. 2

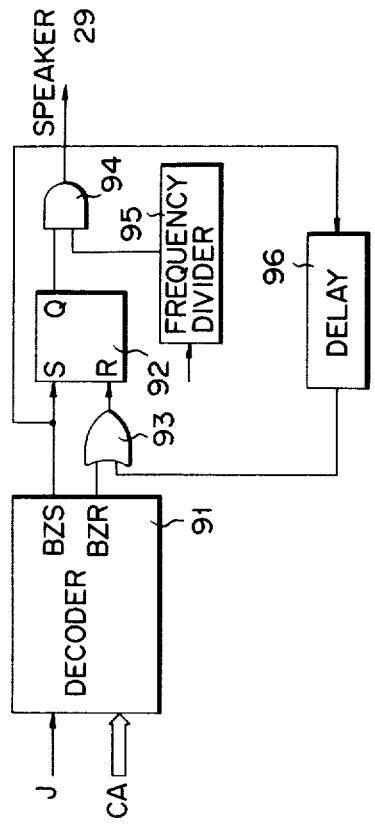
FIG. 5
| CA/RA | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | | | | | YEAR | | MONTH | | DAY | | HOURS/MINUTES | | | | SECOND | |
| 1 | | | | AL3 (H) | AL3 (M) | | AL2 (H) | | AL2 (M) | | AL1 (H) | | AL1 (M) | | | ALF |
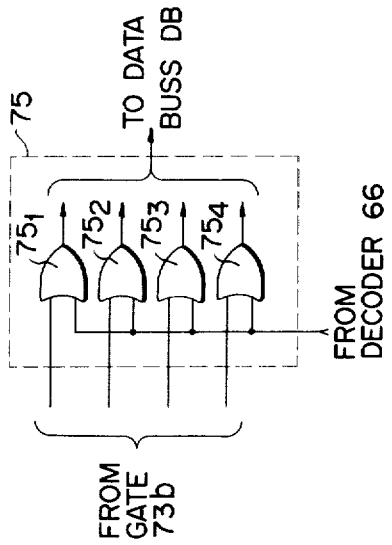
FIG. 6
FIG. 7

FIG. 8

| CA<br>RA | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | UNIT COST ||||| NUMBER |||| DEPARTMENT – 01 SALES TOTAL ||||||||
| 1 | UNIT COST ||||| NUMBER |||| DEPARTMENT – 02 SALES TOTAL ||||||||
| ⋮ | | | | | | | | | | | | | | | | |
| 7 | UNIT COST ||||| NUMBER |||| DEPARTMENT – 08 SALES TOTAL ||||||||
| 8 | | | | | | | | | | | | | | | $F_1$ | RT |
| ⋮ | | | | | | | | | | | | | | | | |
| 15 | | | | | | | | | | | | | | | | |

F I G. 9
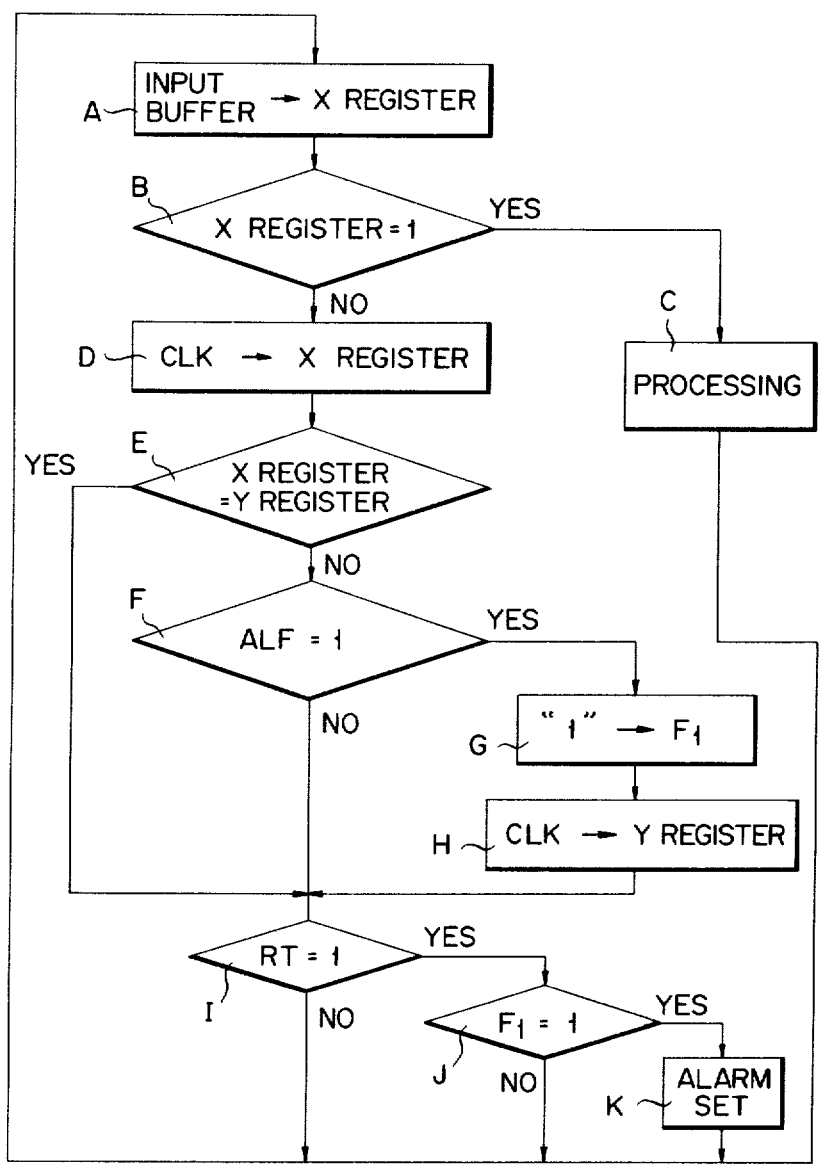

ELECTRONIC CASH REGISTER

BACKGROUND OF THE INVENTION

This invention relates to an electronic cash register having a time keeping circuit.

A conventional electronic cash register has various functions other than a cash registering function, such as an alarm function for informing an operator of a shift of a person-in-charge, the close of work etc. and a time display function for displaying amount and time data on the same display tube. The electronic cash register of this type has such a drawback that when the present time is reached an alarm is sounded even during a registering operation. Suppose that a registering operation is being effected. In this case the registering operation has to be continued until a receipt has been issued after completion of the registering operation. If an alarm is sounded during the registering operation there is a risk that it will be mistaken for a key operating sound. If the amount and time data are switchingly displayed on the same display tube, there is a risk that the operator trying to display the amount data will inadvertently operate a changeover switch for time data, during the registering operation, with the result that the present time data is displayed on the display tube.

SUMMARY OF THE INVENTION

It is accordingly an object of this invention to provide an improved electronic cash register free from the above-mentioned drawbacks which can prevent an operation other than a registering operation from being effected during a cash registering operation. In order to attain the above-mentioned object there is provided an electronic cash register comprising a keyboard having data input keys for cash amount display, a registration complete key and a time display key (provided as required); a memory into which data is inputted by operating the data input key; a printing section for printing the data read out by a central processing unit from the memory onto a sheet; a flag memory having a flag stored therein, the above-mentioned flag indicating a time period elapsing from the operation of the registration complete key to the start of a next registration operation; a time keeping circuit into which at least present time data is set and a time memory into which time data and alarm time data are stored; and means for causing an operation other than a cash registering operation, such as a present time data display operation or an alarm operation to be effected when the flag of the flag memory indicates the above-mentioned time period.

According to this invention, when an alarm time is reached, judgement is made as to whether or not the cash registering operation is now being effected. If the cash registering operation is not being effected, an alarm operation is immediately effected. If the cash registering operation is being effected, an alarm operation can be effected after a registering operation has been completed, thereby eliminating any confusing alarm sound.

Where amount data and time data are switchingly displayed on the same display section, present time can be displayed by operating a specific key, after a receipt has been issued subsequent to the completion of a registering operation. In consequence, the cash register of this invention can prevent an inadvertent time display during the registering operation. Moreover, time data can be continuously displayed in a time period left from the completion of the registering operation to the start of a next registering operation. An alarm sound produced subsequent to the issuance of a receipt can be stopped by operating a specific key so that time display can be effected.

BRIEF DESCRIPTION OF THE DRAWINGS

FIG. 2 is a block diagram showing a system of this invention as a whole;

FIG. 5 is a view showing one form of a random access memory in the time keeping circuit of FIG. 4;

FIG. 6 shows one form of a logic circuit of an OR gate group of FIG. 4;

FIG. 7 is a block circuit diagram showing one form of an alarm circuit of FIG. 2;

FIG. 8 is a view showing one form of the contents of a memory circuit of FIG. 2;

FIG. 9 shows a flow chart for explaining one operation mode of this invention.

DETAILED DESCRIPTION

The front operating section 10 of an electronic cash register will be explained by referring to FIG. 1.

Figure 1:
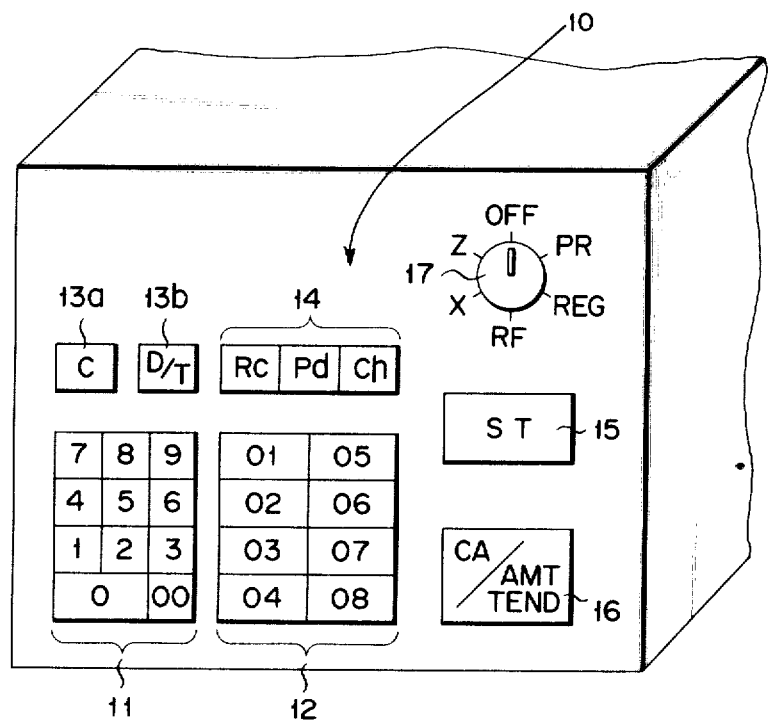
FIG. 1 shows a front view of an operating section of a cash register according to this invention in which various keys are arranged.

In FIG. 1, 11 shows entry keys for entering the amount of a commodity etc.; 12, department keys for designating a department to which the commodity belongs; 13a, a clear key for cancelling entered data; 13b, a Day/Time key for setting day/time data; 14, transaction keys for transactions such as RECEIPT, PAID OUT, CHARGE etc.; 15, a sub-total key for obtaining a sub-total; and 16, a cash/amount tender key for issuing a receipt for a total/change involved. 17 shows a mode switch by which switching is effected between [OFF], [REG], [RF], [X], [Z] and [PR]. In the mode switch, [OFF] corresponds to the inoperative state of the cash register and [REG] is used when a normal registering operation is effected. [RF] is used when part of the money registered in the cash register is refunded; [X], when stored data is read out without being destroyed; [Z], when a reset operation is effected after stored data is read out; and [PR], when a unit price etc. is preset.

A system configuration of this invention will now be explained by referring to FIG. 2. In FIG. 2, 21 shows a cpu (central processing unit). A memory circuit 22 and time keeping circuit 23 are connected to the cpu through a data bus DB for transferring data D, through a row address bus RB for transferring a row address RA and through a column address bus CB for transferring a column address CA. The memory circuit 22 and time keeping circuit 23 are individually formed of an integrated circuit. The memory circuit 22 and time keeping circuit 23 are chip-designated by chip enable signals $CE_1$ and $CE_2$, respectively, sent from the cpu and READ/WRITE-designated by a READ/WRITE signal $R/W_2$ from the cpu. An I/O port 24 is connected to cpu 21 through the data bus DB and through the column address bus CB. An operation signal J is supplied from cpu 21 to the I/O port 24. A key input section 25, display section 26 and printing section 27 are connected to the I/O port 24. When a key operation is effected the key input section 25 delivers a key input signal KI to an input buffer 24a in the I/O port 24 in response to a timing signal KP from the I/O port 24. The display section 26 effects a display operation in accordance with a digit signal DG from the I/O port 24 and a segment signal SG which is obtained by decoding the data of a display buffer 24b. The printing section 27 is, for example, a line printer and a printing position signal T of a printing drum is supplied to the I/O port 24. When coincidence occurs between the printing position signal T and the data of the printing buffer 24c in the I/O port 24 a hammer drive signal MD is supplied to the printing section 27, causing a hammer to be driven to permit characters to be printed on a receipts sheet or a journals sheet. An alarm circuit 28 is connected to cpu 21 through the column address CB. The alarm circuit 28 delivers an alarm signal upon receipt of an operation signal J from cpu 21 to drive a speaker 29.

The detail of cpu 21, time keeping circuit 23, alarm circuit 28 and memory circuit 22 will be explained by referring to FIG. 3 to FIG. 7.

Figure 3:
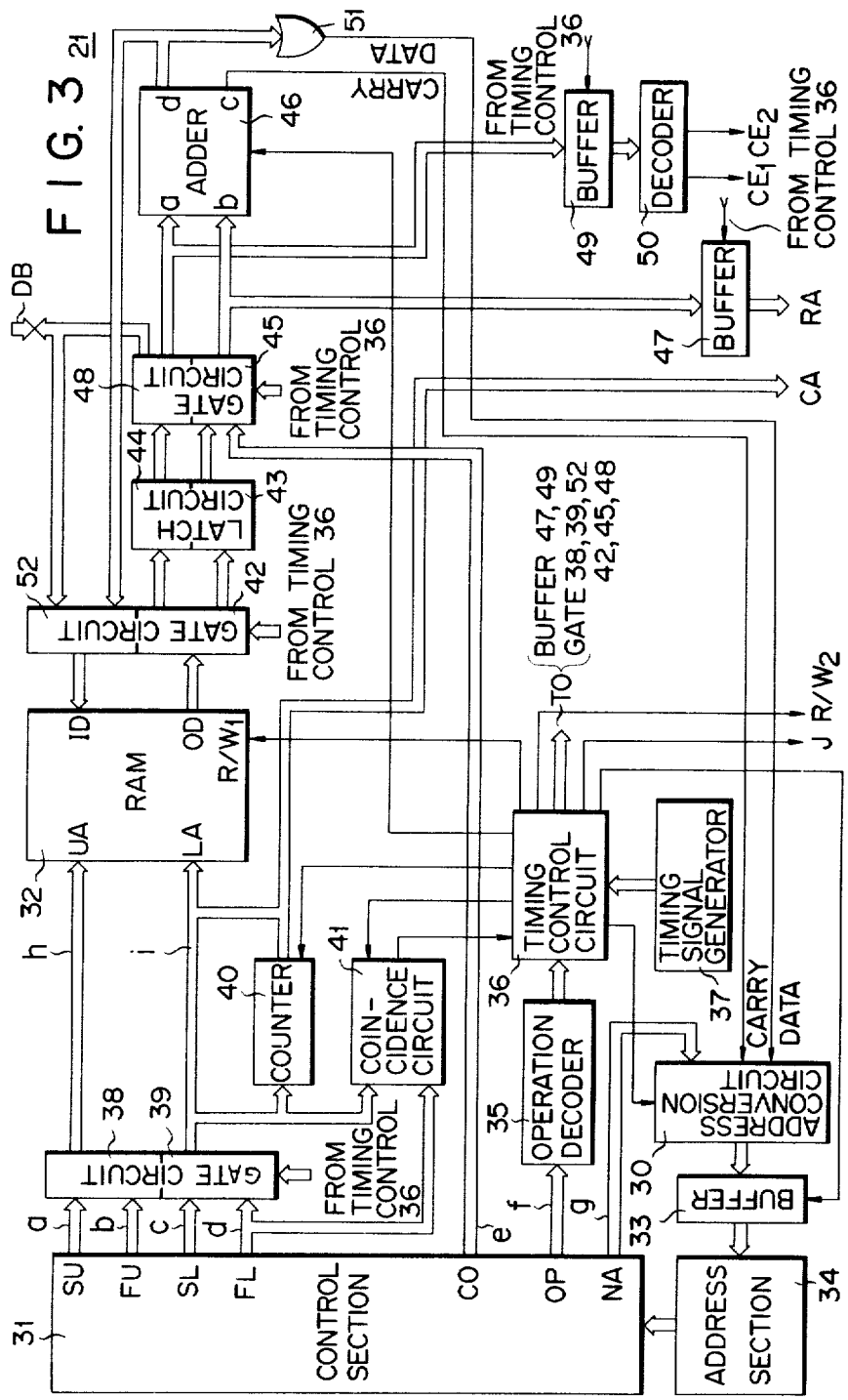
FIG. 3 is a block diagram showing an inner arrangement of a central processing unit of FIG. 2.

FIG. 3 is a block diagram showing the detail of cpu 21. In FIG. 3, 31 shows a control section in which various microinstructions are stored. The control section 31 delivers in parallel fashion signals SU, FU, SL, FL, CO, OP and NA respectively through buses a, b, c, d, e, f and g. The signal SU is a signal for designating a row address in which first operands of a RAM 32 are stored; the signal FU, a signal for designating a row address of a RAM 32 in which second operands are stored; the signal SL, a signal for designating a column address of the RAM 32 in which said first operands are stored or a process starting column address; the signal FL, a signal for designating a column address of the RAM 32 in which said second operands are stored or a process ending column address; the signal CO, a numeral code signal; the signal OP, an operation code for a calculation instruction, transfer instruction etc.; and the signal NA, a signal for designating a next address. The signal NA is delivered through the bus line g to an address conversion circuit 30 and then to a buffer register 33 where it is temporarily stored. The output of the buffer register 33 is inputted to the address section 34. The address section 34 designates an address of the control section 31 in accordance with the signal of the buffer register 33. The operation code OP is supplied through the bus line f to the operation decoder 35 where it is decoded. The decoded output of the operation decoder 35 is supplied to a timing control circuit 36. In accordance with the instruction signal from the operation decoder 35 and a timing signal from a timing signal generating circuit 37 the timing control circuit 36 supplies a gate control signal to the gate circuits 38 and 39, an up/down count instruction signal to a counter 40, a coincidence detection instruction signal to a coincidence circuit 41, an ADD/SUBTRACT signal to an adder circuit 46, a judgement instruction signal to the address conversion circuit 30 and a READ/WRITE instruction signal $R/W_1$ to RAM 32. The timing control circuit 36 also supplies a READ/WRITE instruction signal $R/W_2$ to the memory circuit 22 and time keeping circuit 23 and an operation signal J to the I/O port 24 and alarm circuit 28.

The row addresses SU and FU from the control section 31 are supplied respectively through the bus lines a and b to the gate circuit 38. The output of the gate circuit 38 is fed through a bus line h to a row address input terminal UA of RAM 32. The signals SL and FL from the control section 31 are supplied respectively through the bus line c and d to the gate circuit 39. The output of the gate circuit 39 is supplied through a bus line i to a column address input terminal LA and it also supplied as a column address signal CA to the exterior of cpu. The output of the gate circuit 39 is also supplied to the counter 40. The counter 40 effects a counting operation by a predetermined timing signal. The counter 40 has its contents normally counted up one unit each time it receives the timing signal from timing control circuit 36. When a down count instruction signal is supplied from the timing control circuit 36 the counter 40 has its contents counted down one unit each time it receives the timing signal. The output of the counter 40 is delivered to the column address input terminal LA and as a column address signal CA to the exterior of cpu. The output of the counter 40 is also supplied to one input terminal of the coincidence circuit 41. A process ending column designating address FL outputted from the control section 31 is fed to the other input terminal of the coincidence circuit 41. The coincidence output of the coincidence circuit 41 is coupled to the timing control circuit 36.

For example, registers X, Y and Z, not shown, are arranged in RAM 32 (calculation memory). The registers X, Y and Z has its address designated by the signal Fu or Su. The digit position of these registers is designated by the signal FL or SL and a read/write operation of these registers is designated by the READ/WRITE instruction signal $R/W_1$ from the timing control circuit 36. The first and second operands address-designated by the row and column address signals or data read out for transfer etc. is outputted, as a parallel 4-bit data, from the output terminal OD of RAM 32 and it is delivered through a gate circuit 42 to latch circuits 43, 44. The output of the latch circuit 43 is supplied to an input terminal b of the adder circuit 46 through a gate circuit 45 and to a buffer 47. The buffer 47 receives an input signal upon receipt of a predetermined timing signal from the timing control circuit 36 and the output of the buffer 47 is delivered as a row address signal RA. The output of the latch circuit 44 is supplied into the data bus DB through the gate circuit 48. The output of the latch circuit 44 is also supplied through the gate circuit 48 to an input terminal of the adder circuit 46 and to a buffer 49. The buffer 49 is adapted to receive an input signal by a predetermined timing signal from the timing control circuit 36. Data stored in the buffer 49 is decoded by a decoder 50 which delivers chip enable signals $CE_1$ and $CE_2$. A carry signal from an output terminal C of the adder circuit 46 and data supplied from an output terminal d of the adder circuit 46 through an OR circuit 51 are supplied to the address conversion circuit 30. The data from the output terminal d of the adder circuit 46 is supplied, together with data inputted through the data bus DB, to the gate circuit 52. The output of the gate circuit 52 is applied to a data input terminal ID of RAM 32. The gate circuit 52 and gate circuits 38, 39, 42, 45 and 48 are controlled by a signal from the timing control circuit 36.

Figure 4:
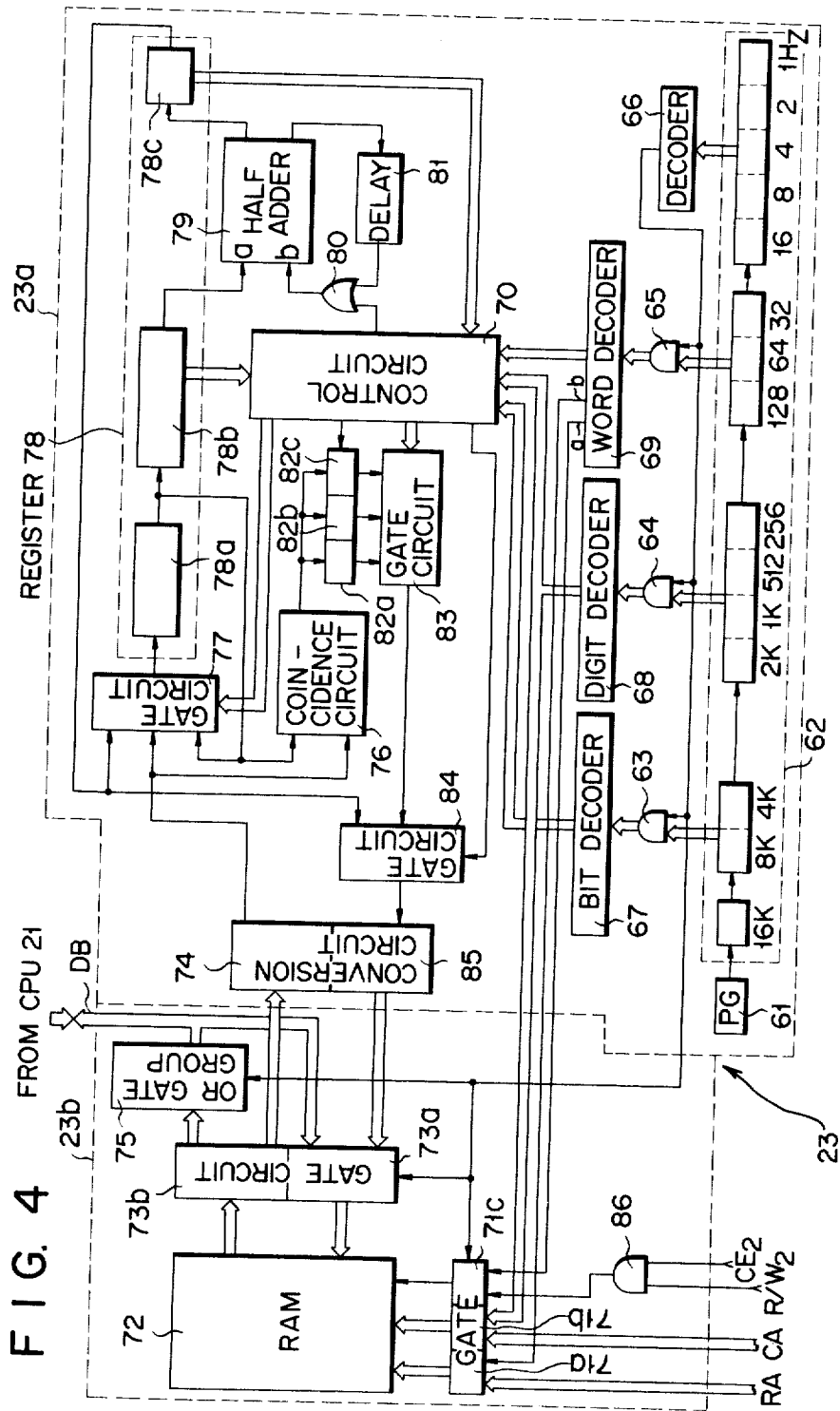
FIG. 4 is a block diagram showing one form of an inner arrangement of a time keeping circuit of FIG. 2.

FIG. 4 shows a detail of a time keeping circuit 23. The time keeping circuit 23 comprises a timepiece 23a and time memory 23b. In FIG. 4, 61 shows a pulse generator for generating a reference pulse signal of, for example, 32 KHz. The output of the pulse generator PG is supplied to the frequency dividing counter 62. The frequency dividing counter 62 is constructed of, for example, 15 bits and adapted to sequentially frequency-divided the inputted 32 KHz signal down to a 1 Hz signal. 8 KHz and 4 KHz bit outputs of the frequency dividing counter 62 are applied to an AND circuit 63; 2 K, 1 K, 512 and 256 Hz bit outputs of the frequency dividing counter 62 is applied to an AND circuit 64; 128, 64 and 32 Hz bit outputs of the frequency dividing counter 62 is applied to an AND circuit 65; and 16, 8, 4, 2 and 1 Hz bit outputs of the frequency dividing counter 62 are applied to a decoder 66. The decoder 66 detects the zero states of 16, 8, 4, 2 and 1 Hz bit outputs of the frequency dividing counter 62 and delivers a "1" signal when there bit outputs are all "zeroes". The detection output of the decoder 66 is supplied as a gate signal to the AND circuits 63 to 65. The output of the AND circuit 63 is applied to a bit decoder 67, the output of the AND circuit 64 is applied to a digit decoder 68, and the output of the AND circuit 65 is applied to the word decoder 69. The output of the bit decoder 67 provides a clock i.e. a basis of the operation of the timepiece 23a and is supplied to a control circuit 70. The digit decoder 68 delivers a digit signal of a one digit per 4 bits configuration to the control circuit 70 and, as a column address signal for RAM 72, to a gate circuit 71b. The word decoder 69 delivers a word signal of a one word per 16 digits configuration to the control circuit 70. The word decoder 69 has output lines a and b for delivering the bit outputs of 128 and 64 Hz which are inputted through the AND circuit 65. A signal outputted through the output line a is supplied, as a READ/WRITE instruction signal for RAM, to a gate circuit 71c and a signal outputted from the output line b is supplied, as a row address signal for RAM 72, to the gate circuit 71a. A READ/WRITE instruction signal R/W$_2$ and chip enable signal CE$_2$ from cpu are supplied through an AND circuit 86 to the gate circuit 71c, a row address signal RA from cpu 21 is supplied to the gate circuit 71a and a column address signal CA is supplied to the gate circuit 71b. The gate circuits 71a to 71c has their gates switched by the zero detection signal which is supplied from the decoder 66. When the zero detection signal is a logical "0" level the gate circuits 71a to 71c select the signals CA, RA, R/W$_2$ and CE$_2$. When the zero detection signal is a logical "1" level the gate circuits 71a to 71c select the signals of the digit decoder 68 and word decoder 69. The outputs of the gate circuits 71a to 71c are supplied to a RAM 72 where alarm setting data and present data are stored. RAM 72 is of a 2 row×16 column configuration as shown, for example, in FIG. 5. The present date/time data is written into 11 to 0 columns of a first 0 row of RAM 72 and the hour/minutes time data of three kinds of alarms AL3 to AL1 are written into 13 to 2 columns of a second 1 row of RAM 72. An alarm flag ALF is written into the first 0 column of the second 1 row of RAM 72. An alarm flag ALF indicates whether or not the alarm setting data AL1 to AL3 coincides with the present data. When the alarm setting data AL1 to AL3 coincides with the present data (in this case, three of four bit positions in the first 0 column of the second 1 row are utilized) a "1" signal is set to the corresponding bit position. A WRITE data sent through the data bus DB is supplied through the gate circuit 73a to RAM 72 as shown in FIG. 4 and a READ data is sent through the gate circuit 73b to a conversion circuit for converting parallel data to series data, and also to an OR gate group 75. The OR gate group 75 comprises, as shown in FIG. 6, OR gates 75$_1$, 75$_2$, 75$_3$ and 75$_4$ of which the input terminals receive the corresponding bits of the parallel 4-bit output of the gate circuit 73b. A zero detection signal from the decoder 66 is inputted to the other input terminal of each of these OR gates. The outputs of these OR gates are sent into the data bus DB. When a logical "1" level is outputted from the decoder 66 a busy signal [1111] is outputted from the OR gate group 75. The output of the conversion circuit 74 is supplied to a coincidence circuit 76 and also to a 4 digit shift register 78a through a gate circuit 77 which is controlled by the output of the control circuit 70. The output of the shift register 78a is supplied to the coincidence circuit 76 and to an 11-digit shift register 78b. The shift register 78b has its bit outputs supplied to the control circuit 70 and its final bit output inputted to an input terminal a of a half adder 79. A numeral code [1] from the control circuit 70 is supplied through an OR circuit 80 to an input terminal b of the half adder 79. The carry output of the half adder 79 is supplied back to the input terminal b of the half adder 79 through a 1-bit delay circuit 81 and OR circuit 80. The added output of the half adder 79 is inputted to a one-digit (4-bit) shift register 78c. The shift register 78c has its bit outputs supplied to the control circuit 70 and its final bit output supplied back to the shift register 78a through the gate circuit 77. A time counting register 78 comprises the above-mentioned shift register 78a, 78b, 78c and is adapted to effect a shift operation by a timing pulse outputted from the bit decoder 67. The output of the coincidence circuit 76 is inputted to flip-flops 82a, to 82c for storing a coincidence output. The flip-flops 82a to 82c have their operation timing controlled by a signal from the control circuit 70 and each of these flip-flops is operated by a different timing. That is, the flip-flops 82a to 82c store the state of coincidence or noncoincidence between three kinds of the alarm data and the present data. The outputs of the flip-flops 82a to 82c are supplied to the conversion circuit 85 through an output gate 83 and gate circuit 84 which are gate-controlled by the control circuit 70. The series output of the shift register 78c is inputted through the gate circuit 84 to the conversion circuit 85 where it is converted to parallel data. The data of the conversion circuit 85 is fed through the gate circuit 73a to RAM 72 where the present data and the alarm flag ALF are written. The gate circuits 73a and 73b have their gate switching effected by a zero detection signal sent from the decoder 66. When the zero detection signal is a logical "0" level, the gate circuits have data transfer effected through the data bus DB and, when the zero detection signal is a logical "1" level, the gate circuits have data transfer effected with respect to the conversion circuits 74 and 85.

The time keeping circuit 23 has present data and time data written by a key operation at the key input section 25. That is, when the data/time setting key is operated, data is inputted to the input buffer 24a in the I/O port 24. The data of the input buffer 24a is written into RAM 32 in cpu 21. Detection is also made as to whether or not a busy signal is outputted from the OR gate group 75. If at this time no busy signal is present, the data/time data, together with the chip enable signal CE$_2$, WRITE instruction signal R/W$_2$, row address signal RA and column address signal CA is inputted into RAM 72 from cpu 21. Thus, current year, month, day-of-month, hour, minute, second data are written in the 11 to 0 columns of the 0 row of RAM 72. Likewise, the alarm data AL1 to AL3, timer data TM etc. can also be written from cpu 21 into RAM 72 through the bus DB. When the decoder 66 detects "all 0" level state and thus a zero detection signal is outputted as a logical "1" signal, the gate circuits 71a to 71c, 73a and 73b are switched such that data transfer can be effected in the time keeping circuit 23, and a time counting operation is started. That is, a reference pulse signal outputted from the pulse generator 61 (oscillator) is frequency-divided at the frequency dividing counter 62 to produce predetermined frequency dividing outputs. The outputs are inputted into the AND circuits 63 to 65 and decoder 66. The decoder 66 produces a logical "1" level signal when it detects the "all 0" level state of 16, 8, 4, 2 and 1 Hz bit outputs of the counter 62. All the bits of 16, 8, 4, 2 and 1 Hz bit outputs of the counter 62 become "0" at a rate of 1/32 second per second. At this time, the decoder 66 produces a "1" level output to cause the AND circuits 63 . . . 65 to be opened. As a result, the predetermined bit outputs of the counter 62 are supplied respectively through the AND circuits 63 to 65 to the decoders 67 to 69. From the decoders 67, 68 and 69 a timing signal and address data are supplied to the corresponding circuits. That is, the output of the bit decoder 67 is sent as a shift signal of the time counting register 78 to the control circuit 70, the output of the digit decoder 68 is sent as a timing signal to the control circuit 70 and as a column address to RAM 72 through the gate circuit 71b, and the output of the word decoder 69 is sent as a timing signal to the control circuit 70. Signals on the lines a and b of the word decoder 69 are sent respectively as a READ/WRITE instruction signal and row address signal to the gate circuits 71c and 71a. During the time period in which the logical "1" level signal is being outputted from the decoder 66, the 128, 64 and 32 Hz bits of the output of the counter 62 varies from [000] to [111] in eight bit stages combinations. A data read/write operation is effected with respect to RAM 72 utilizing, for example, the first four of the eight bit stages i.e. [00] [10] [01] [11] of the 128 and 64 Hz bits. The word decoder 69 delivers four combinations of signals [00]~[11] into the output lines a and b in accordance with the 128 and 64 Hz bit outputs of the counter 62. At first, the outputs on the output lines a and b of the word decoder 69 are both at a logical "0" level. The first 0 row of RAM 72 is address-designated in a readout mode and the column address is designated by the output of the digit decoder 68. As a result, the data/time data on the first 0 row of RAM 72 is read out. The data is supplied through the gate 73b to the conversion circuit 74 where it is converted to series data. The series data is supplied through the gate circuit 77 to the time counting register 78. Under the control of the control circuit 70 the seconds data is added to the numeral code [1] in the half adder 79. Then, the signal on the output line a of the word decoder 69 becomes a logical "1" level and a WRITE instruction signal is supplied to RAM 72. As a result, [1] is added to the second data read out of the time counting register 78 and the renewed date/time data is written into RAM 72. When at the +1 addition time a carry occurs at the time counting register a carry process is effected under the control of the control circuit 70. When the outputs on the output lines a and b of the word decoder 69 are changed to [01], the second 1 row of RAM 72 is designated in a readout mode and the alarm data AL1 to AL3 stored in the second 1 row of RAM 72 are read out. The alarm data AL1 to AL3 are supplied to the coincidence circuit 76 through the gate circuit 73b and conversion circuit 74. Present hour/minute data which is fed in the time counting register 78a in a circulating fashion is inputted into the coincidence circuit 76 from the shift register 78a. The coincidence circuit 76 effects a sequential comparison between the present time data and the alarm data AL1 to AL3 read out of RAM 72. When coincidence occurs the coincidence circuit 76 supplies a coincidence signal to the corresponding flip-flops 82a . . . 82c to cause the latter to be set to a logical "1" level. When the outputs on the output lines a, b of the word decoder 69 are changed to [11] a WRITE mode is changed under the condition that the second 1 row of RAM 72 is designated. The outputs of the flip-flops 82a to 82c are supplied to the output gate 83, the output of which is supplied through the gate circuit 84, conversion circuit 85 and gate circuit 73a to RAM 72 i.e. written into the alarm flag ALF on the first 0 column of the second row of RAM 72. In consequence, cpu 21 examines the contents of the alarm flag and can make judgement as to whether or not the present time reaches an alarm time. In this way, the time counting operation is effected at the rate of once per second and detection is made as to coincidence between the present time data and the alarm data.

FIG. 7 is a block diagram showing a detail of the alarm circuit 28. In FIG. 7, 91 shows a decoder into which the operation signal J and address signal CA are inputted from cpu 21. The decoder 91 decodes the input signal from cpu 21 to deliver a buzzer set signal BZS and buzzer reset signal BZR. The buzzer set signal BZS is inputted to a set terminal S of a flip-flop 92 and the buzzer reset signal BZR is inputted through an OR circuit 93 to a reset terminal R of the flip-flop circuit 92. The set output of the flip-flop 92 is supplied to an AND circuit 94. The output of a frequency dividing circuit 95 for frequency-dividing a pulse signal from, for example, the time keeping circuit 23 into an audio frequency signal is supplied to the AND circuit 94. The output of the AND circuit is sent as a drive signal to the speaker 29. The buzzer set signal BZS is supplied to the reset terminal R of the flip-flop 92 through a delay circuit 96 with a delay of about one minute and OR circuit 93. When an operation signal J for instructing an alarm operation from cpu 21 and address signal CA are received, the alarm circuit 28 decodes both the signals by the decoder 91 to produce a buzzer set signal BZS. The flip-flop 92 is set by the output of the buzzer set signal BZS to cause the gate of the AND circuit 94 to be opened. As a result, the output of the frequency dividing circuit 95 is delivered through the AND circuit 94; causing the speaker 29 to be driven to permit an alarm sound to be produced. The buzzer set signal BZS is fed through the delay circuit 96 and OR circuit 93 to the flip-flop 92 to cause the latter to be reset. In consequence, the speaker 29 is driven for about one minute for alarm. When an alarm sound is stopped by a key operation, the signals J and CA which are sent from cpu 21 to the alarm circuit 28 are sent back as an alarm stopping signal and a buzzer reset signal BZR are delivered from the decoder 91. As a result, the flip-flop 92 is reset, causing an alarm sound to be stopped.

FIG. 8 shows the contents of the memory circuit 22 in FIG. 2. The memory circuit 22 is, for example, of a 16 row × 16 column configuration and stores sales data of departments 1 to 8 in its 0 to 7 rows. For example, the unit prices of a sales article is stored in the 15 to 12 columns of the 0 to 7 rows of the memory circuit 22, the number of the sales articles is stored in the 11 to 8 columns thereof, and a department sales total is stored in the 7 to 0 columns thereof. An alarm memory flag $F_1$ is stored in the 1 column of the 8 row of the memory circuit 22 and a receipts issuing flag is also stored in the 0 column of the 8 row thereof.

The operation of the cash register according to this invention will be explained below by referring to flow chart of FIG. 9.

As shown in step A in FIG. 9 the contents of the input buffer 24a in the I/O port 24 in FIG. 2 is read onto the X register in RAM 32 of cpu 21. At step B, judgement is made as to whether or not data is held in the X register i.e. a key input data is present. When a key input operation is effected at the key input section, key input data is read onto the input buffer in the I/O port 24. The presence or absence of key input data can be judged by examining the contents of the input buffer 24a in the I/O port 24. At steps A and B, the process is effected normally at a predetermined cycle. When at step B the presence of the key input data is judged the process goes to step C where a process is effected with respect to the key input. When the process at step C is completed a return to step A is effected. At step A, data from the input buffer 24a is read onto the X register in cpu 21. If the absence of the key input data is judged at step B the process goes to step D where present hour/minute data CLK from RAM 72 in the time keeping circuit 23 is read onto the X register in RAM 32 of cpu 21. Then, the process goes to step E where judgement is made as to whether or not the contents of the X register coincides with the contents of the Y register. At first, the content of the Y register is [0], but at step H the present time data CLK is written into the Y register as will be described later. Since at first the content of the Y register is [0], "NO" is judged at step E and the process goes to step F where judgement is made as to whether or not an alarm flag ALF is present in RAM 72 of the time keeping circuit 23. If the present time data coincides with any alarm set data, the process goes to step G since "1" is set in either bit position of the alarm flag ALF. At step G, "1" is written into the alarm memory flag $F_1$. Then, the process goes to step H where the present time data from the time keeping circuit 23 is read onto the Y register of cpu 21. When at step H the process is completed, it goes to step I. Where at step F the absence of the alarm flag is judged and at step E "YES" (X=Y) is judged, both the processes go to step I. The step E has the function of preventing an alarm sound from being repeated immediately after the alarm stopping operation is effected by a key operation. That is, when an alarm is sounded the process at step E goes to the step I so as to prevent the process at step G until noncoincidence occurs between the alarm setting time and the present time. At step I judgement is made as to whether or not a receipts issuing flag RT is stored in the 0th column of the 8th row. When a register complete key such as the cash/amount tender key 16 and a transaction key 14 for receipt, paid-out and charge is operated, the accumulation processing of sales data for each transaction and the receipts issuing processing are effected at step C. During these processings, a numeral code signal "1" (signal CO) from the control section 31 in CPU 21 is supplied through the gate circuit 45, adder 46 and gate circuit 52 by way of a bus line e to RAM 32 where it is stored. The numeral code signal "1" read out of RAM 32 is supplied through the latch circuit 44 and gate circuit 48 by way of the data bus DB to said area of the memory circuit 22 where it is stored as a flag RT.

When the entry keys 11 are operated, the input processing of amount data is effected at step C. During this processing, judgment is made as to whether or not the flag RT is "1". If the flag RT is "1", it is rewritten as "0". That is, during the time period in which the flag RT is set to "1", the registering operation is completed. After the registration complete key is operated, a period up to the start of the next registration operation is indicated. When, at step I, RT=0 is detected, the state "now under the registration operation" is indicated and the process goes back to step A. If at step I a receipts issuing flag RT is judged as being "present" i.e. the issuance of the receipt is confirmed the process at step I goes to a step J where judgement is made as to whether or not an alarm memory flag $F_1$ is present. If at step J the absence of the flag $F_1$ is judged the process at step J goes back to the step A and the above-mentioned operation is repeated. If at step J the presence of the flag $F_1$ is judged the process goes to a step K. At step K an alarm setting code signal is sent from cpu 21 to the alarm circuit 28 for alarm operation. When the alarm sounding operation is completed the process goes back to the step A in readiness a next alarm operation.

Figure 10:
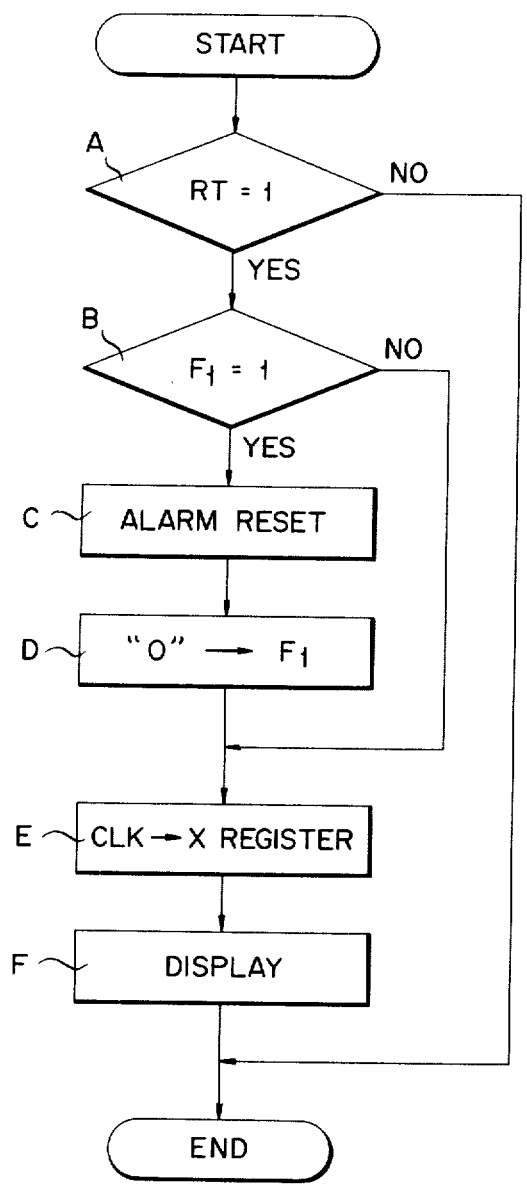
FIG. 10 shows a flow chart for explaining another operation mode of this invention.

Explanation will be made, by reference to the flow chart of FIG. 10, of the case where after the completion of a registration for a customer and issuance of a receipt, a present time is indicated by operating the time key, and the case where when an alarm is being given it is interrupted by the key actuation.

Where it is desired to display present data or stop an alarm sound a data/hour key 13b of the key input section 25 is operated. When the data/hour key 13b is operated, cpu 21 makes judgement as to whether a receipts issuing flag RT is present in the memory circuit 22. The receipts issuing flag RT is set to "1" after a receipt is issued by the operation of a cash/amount tender key 16, and set to "0" by a first data entry for the next customer after the receipt is issued. When at this step (step A) RT=0 is judged, no processing is effected for time display and alarm sound. When at step A the presence of a receipts issuing flag RT is judged the process goes to a step B where judgement is made as to whether or not an alarm memory flag $F_1$ is present in the memory circuit 22. When at step B the presence of the flag $F_1$ is judged, the process goes to step C. At step C an alarm resetting code is sent from cpu 21 to the alarm circuit 28 so as to interrupt an alarm sound. At step D, "0" is written into the alarm memory flag $F_1$ in the memory circuit 22. The process at step D goes to a step E. At step E, a present time data CLK is read out of RAM 72 of the time keeping circuit 23 and it is set in the X register of cpu 21. When at step B the absence of the flag $F_1$ is judged, the process at B goes to the step E. When at step E the present time data is set in the X register, the set data is sent at step F to the display section 26 through display buffer 24b where the present data is displayed. In this way, the present time display and the stopping of the alarm sound are completed.

What is claimed is:

1. An electronic cash register comprising:
   a keyboard having data input keys for inputting numeral data, a registration complete key for completing a registration operation and issuing a receipt and a time display key for instructing a time indication;
   a central processing unit coupled to said keyboard;

memory means coupled to said central processing unit and having means for storing input data therein;

a printing section coupled to said memory means for printing said input data;

a flag memory coupled to said central processing unit and storing therein a flag indicating a time period elapsing from an operation of said registration complete key to a start of the next registration operation;

time counting means coupled to said central processing unit and in which a present time data is set; and display means coupled to said memory means and to said time counting means for normally displaying input data inputted by operation of said data input keys, and for displaying present time responsive to when said time display key is operated and a flag of said flag memory indicates said time period elapsing from the operation of the registration complete key to the start of the next registration operation.

2. An electronic cash register comprising:

a keyboard having data input keys for inputting numeral data, a registration complete key for completing a registration operation and issuing a receipt;

a central processing unit coupled to said keyboard;

memory means coupled to said central processing unit and having means for storing input data therein;

a printing section coupled to said memory means for printing said input data;

a flag memory connected to said central processing unit to store therein a flag indicating a time period elapsing from an operation of said registration complete key to the start of the next registration operation;

a time memory coupled to said central processing unit for storing present time data and alarm time data;

a timepiece coupled to said time memory to update the present time data; and alarm means coupled to said central processing unit and to said time memory to start an alarm operation when the present time data coincides with the alarm time data and the flag of said flag memory indicates a time period elapsing from the operation of the registration complete key to the next registration operation.

3. An electronic cash register comprising:

a keyboard having data input keys for inputting numeral data, a registration complete key for completing a registration operation and issuing a receipt and a time display key for instructing a time indication;

a central processing unit coupled to said keyboard;

memory means coupled to said central processing unit and having means for storing input data therein;

a printing section coupled to said memory means for printing said input data;

a flag memory coupled to said central processing unit and storing therein a flag indicating a time period elapsing from the operation of said registration complete key to the start of the next registration operation;

a time memory coupled to said central processing unit for storing present time data and alarm time data;

a timepiece coupled to said time memory to renew the present time data;

alarm means coupled to said central processing unit and to said time memory for starting an alarm operation when the present time data coincides with the alarm time data and the flag of said flag memory indicates said time period, and for terminating an alarm operation by operating said time display key; and display means coupled to said memory means and to said time memory for receiving and normally displaying input data inputted by operation of said data input key, and for displaying present time responsive to when said time display key is operated and the flag of said flag memory indicates said time period.

* * * * *